(12) United States Patent
Cleary et al.

(10) Patent No.: US 8,671,053 B2
(45) Date of Patent: *Mar. 11, 2014

(54) DIRECT CURRENCY CONVERSION

(75) Inventors: Denis Cleary, Killorglin (IE); Tim Ring, Killorglin (IE)

(73) Assignee: FEXCO Merchant Services, Killorglin, County Kerry (IE)

( * ) Notice: Subject to any disclaimer, the term of this patent is extended or adjusted under 35 U.S.C. 154(b) by 750 days.

This patent is subject to a terminal disclaimer.

(21) Appl. No.: 12/917,379

(22) Filed: Nov. 1, 2010

(65) Prior Publication Data

US 2011/0047073 A1    Feb. 24, 2011

Related U.S. Application Data

(63) Continuation of application No. 11/569,958, filed as application No. PCT/AU2005/000983 on Jul. 6, 2005, now Pat. No. 7,953,634.

(30) Foreign Application Priority Data

Jul. 12, 2004 (AU) ................................ 2004903810
Jul. 12, 2004 (NZ) ........................................ 534045

(51) Int. Cl.
*G06Q 40/00*        (2012.01)

(52) U.S. Cl.
USPC ................. 705/39; 705/16; 705/40; 709/247; 235/380

(58) Field of Classification Search
USPC .................................. 705/16, 21, 40; 709/247
See application file for complete search history.

(56) References Cited

U.S. PATENT DOCUMENTS

| | | | |
|---|---|---|---|
| 4,968,873 | A | 11/1990 | Dethloff et al. |
| 5,386,458 | A | 1/1995 | Nair et al. |
| 5,420,405 | A | 5/1995 | Chasek |
| 5,659,165 | A | 8/1997 | Jennings et al. |

(Continued)

FOREIGN PATENT DOCUMENTS

| | | |
|---|---|---|
| EP | 251619 A2 | 1/1988 |
| EP | 843292 A2 | 5/1998 |

(Continued)

OTHER PUBLICATIONS

Akers, S. B., "Binary Decision Diagrams," IEEE Transaction on Computers, Jun. 6, 1978, 8pages, vol. C-27, No. 6.

(Continued)

*Primary Examiner* — Vanel Frenel
(74) *Attorney, Agent, or Firm* — Kilpatrick Townsend & Stockton LLP

(57) ABSTRACT

This invention concerns direct currency conversion, that is automatic currency conversion at point of payment for card transactions. In particular it concerns a method for operating equipment associated with a financial transaction. The method includes the steps of: Presenting a card related to a customer's account. Recording a card number from the card. Applying all or part of the card number to a tree structure, and automatically processing that number by the tree one bit at a time to arrive at an end node of the tree coded with information related to the currency of the customer's card account. Determining the currency of the customer's card account. Comparing the currency of the customer's card account with one or more currencies predetermined for the equipment. Where the comparison indicates different currencies, providing direct currency conversion services. In other aspects it concerns the equipment itself, and a method of preparing a tree structure for use by the equipment.

23 Claims, 2 Drawing Sheets

(56) References Cited

U.S. PATENT DOCUMENTS

| | | | |
|---|---|---|---|
| 5,687,323 | A | 11/1997 | Hodroff |
| 5,914,472 | A | 6/1999 | Foladare et al. |
| 6,067,574 | A | 5/2000 | Tzeng |
| 7,003,504 | B1 | 2/2006 | Angus et al. |
| 7,328,188 | B1 | 2/2008 | Barry |
| 2002/0071194 | A1 | 6/2002 | Honma |
| 2003/0024979 | A1 | 2/2003 | Hansen et al. |
| 2003/0126113 | A1 | 7/2003 | Brown |
| 2003/0225913 | A1 | 12/2003 | Bussler et al. |
| 2004/0044739 | A1 | 3/2004 | Ziegler |
| 2004/0210564 | A1 | 10/2004 | Oksanen |
| 2005/0131806 | A1 | 6/2005 | Barry |
| 2005/0154674 | A1 | 7/2005 | Nicholls et al. |
| 2006/0010058 | A1 | 1/2006 | D'Hers et al. |

FOREIGN PATENT DOCUMENTS

| | | |
|---|---|---|
| EP | 1018711 A1 | 7/2000 |
| EP | 1018711 B1 | 12/2000 |
| FR | 2818767 | 12/2000 |
| GB | 2 300 742 A | 11/1996 |
| JP | 54061598 A | 5/1979 |
| JP | 5189664 A | 7/1993 |
| JP | 06-203273 | 7/1994 |
| JP | 9305822 A | 11/1997 |
| JP | 10269395 A | 10/1998 |
| JP | 11066208 A | 3/1999 |
| JP | 11-134416 | 5/1999 |
| JP | 11242781 | 9/1999 |
| JP | 11328539 | 11/1999 |
| JP | 2000-48108 | 2/2000 |
| JP | 2000212642 | 8/2000 |
| JP | 2001273568 | 10/2001 |
| WO | WO 95/12169 A1 | 5/1995 |
| WO | WO 96/36024 A1 | 11/1996 |
| WO | WO 97/04411 A1 | 2/1997 |
| WO | WO 99/05655 A1 | 2/1999 |
| WO | WO 99/12136 A1 | 3/1999 |
| WO | WO 02/019275 A1 | 3/2002 |
| WO | WO 02/071194 A2 | 9/2002 |
| WO | WO 02/095540 A2 | 11/2002 |
| WO | WO 2004/008399 | 1/2004 |

OTHER PUBLICATIONS

Bentley, J. L., "Multidimensional Binary Search Trees in Database Applications," IEEE Transactions on Software Engineering, Jul. 4, 1979, 8 pages, vol. SE-5, No. 4.

Bentley, J. L., "Multidimensional Binary Search Trees Used for Associative Searching," 1975 ACM Student Award Paper: Second Place, Sep. 1975, 9 pages, vol. 18, No. 9.

Cormen, T. et al., "Introduction to Algorithms," Jan. 1991, 9 pages, The MIT Press, McGraw-Hill Book Company.

Ottmann T. et al., "Algorithmen und Datenstrukturen," Jan. 1990, 16 pages, Wissenschaftsverlag.

Summons to Attend Oral Proceeding of EP 05759075.4 mailed on Dec. 27, 2011, 7 pages.

Declaration of Patrick Shiel, filed with the U.S. Patent and Trademark Office on Jun. 11, 2008.

Dual Currency Terminal Application, NaBanco's Caribbean News, vol. 8, published May 31, 1995.

Erste Kartenzahlung in Euro mit Visa: Mit dem ersten Testkauf in Euro startet Via zur Einheitswahrung durch, Visa—Presse & Fakten, published Jul. 15, 2002.

Fexco Launch Multi-Currency Management Terminal, Innsight, published March 1999/Fexco Group News, published First Quarter 1999.

Flexicom, *MCPOS Authorisation and Batching Application*, Functional Specification Issue 1.0, Jul. 27, 1998, pp. 1-64.

"How Credit Cards Work," Internet Citation, http://vclass.mgt.psu.as.th/parinya/MISMBA2004/sectionII/hardware-howstuffworks/HSW-communication/credit-card.pdf, Jan. 2004.

Identification Cards—Identification of issuers, BSI Standards, published Aug. 15, 1995.

Laurenz Kohlleppel: "The Euro Area: a Business Opportunity for National ACHs", Internet Citation, URL:http://www.ecb.int/events/pdf/conferences/09Kohlleppe1GZS.pdf, Feb. 7, 2001, p. 29PP.

The High Court of the Republic of Singapore, Judgment, Case No. [2006]SGHC 233, *Main-Line Corporate Holdings Limited* v. *United Overseas Bank Limited* . . . , Dec. 21, 2006.

The Power to Grow, Verifone published Feb. 1997.

Visa, Member Letter, Currency Conversion at the Point of Transaction, Dec. 1997.

US 7,255,692, 08/2007, Stoltz et al. (withdrawn)

DIRECT CURRENCY CONVERSION

CROSS-REFERENCES TO RELATED APPLICATIONS

This application is a continuation of U.S. patent application Ser. No. 11/569,958, filed on Dec. 1, 2006, the complete disclosure of which is hereby incorporated by reference.

TECHNICAL FIELD

This invention concerns direct currency conversion, that is automatic currency conversion at point of payment for card transactions. In particular it concerns a method for operating equipment associated with a financial transaction. In other aspects it concerns the equipment itself, and a method of preparing a tree structure for use by the equipment.

BACKGROUND OF THE INVENTION

Credit cards, debit cards, charge cards and various other types of cards are used by consumers to make purchases or to obtain cash. These transactions generally take place at a merchant's premises using an electronic Point of Sale (POS) device, and during the transaction the device communicates with other parties to obtain authorization for the transaction, and to initiate the transfer of funds from the customer to the merchant. Similar transactions take place using computer equipment without the intermediary of a merchant.

With increasing international travel, globalization of business and electronic commerce, cardholders sometimes wish to conduct transactions in a foreign country using their card. In this case the merchant would normally use a particular currency, which, in the case of a retailer, would generally be the local currency. The credit card would also have a currency, which would generally be the local currency of its issuing bank. Conventionally, for transactions where the two currencies are different, the currency of the transaction would be the currency of the merchant, and would appear as such, together with an exchange rate on the credit card statement. Dynamic currency conversion (DCC) allows a transaction of this kind to be conducted in the currency of the card, by detecting the card currency and applying a currency conversion at the time of the transaction, so that the cardholder sees the value of the transaction in the currency of the card, at that time.

In a simple example of a purchase by a holidaymaker, a POS device would detect the card number and extract the Bank Identification Number (BIN). The machine would associate the BIN with a currency, take this to be the currency of the card and conduct the sale/purchase in the card currency.

BRIEF SUMMARY OF THE INVENTION

In a first aspect the invention is a method for operating equipment associated with a financial transaction to determine the currencies available to be used for a card transaction using that equipment. The method includes the steps of:
  Presenting a card related to a customer's account.
  Recording a card number from the card.
  Applying all or part of the card number to a tree structure, and automatically processing that number by the tree one bit at a time to arrive at an end-node of the tree coded with information related to the currency of the customer's card account.
  Determining the currency of the customer's card account.
  Comparing the currency of the customer's card account with one or more currencies predetermined for the equipment.
  Where the comparison indicates different currencies, providing direct currency conversion services.

Traversing through a tree structure is highly efficient, since only data containing information relevant to the current enquiry is read. This is especially beneficial where the mapping is many to one, as it is in mapping BINs to currency codes.

The equipment may be a Point of Sale (PoS) device, an automated teller machine (ATM) or equipment associated with telephone or Internet sales. In the case of telephone or Internet sales the card details may be remotely manually entered, rather than read automatically by the equipment from the card.

The tree structure may be downloaded and stored at the equipment. In this case all the other steps can be performed at the equipment.

Other determinations may be made from the card number, using the invention. For instance detecting local cards, or trading area cards. This may be of use for instance in controlling qualification for tax free shopping etc.

The equipment generally comprises a card reader, a computer processor and memory, a printer and a user interface. The tree structure may be stored in the memory in the form of a file. The tree may be a sparse binary tree. The end-nodes of the tree structure may be coded with country codes or currency codes.

The step of determining the currency may involve merely interpreting the codes at the end-node. Alternatively, this step may involve further processing such as using the end-code to look up a currency code in an ancillary table.

The comparing step may default to a predetermined currency in the event that a match is found, for instance the native currency of the country where the equipment is located. Alternatively, and when no match is found, all currencies of the card and device may be displayed for the customer's choice. The relevant exchange rates may also be displayed.

The processing and currency selection by the customer may precede the printing of a docket for the customer's approval. The docket may include the price in the currency selected and in the native currency of the equipment as well as the exchange rate, and all these numbers may be captured for use in preparing a statement for the customer's account.

In another aspect the invention is equipment associated with a financial transaction comprising a card reader, computer processor and memory, a printer and a user interface, wherein a tree structure is stored as a file in the memory to process a number read by the card reader one bit at a time to arrive at an end-code of the tree coded with information related to a currency.

In a further aspect the invention is a method of preparing a tree structure for use in the method and saving it as a file, then downloading the file to the equipment associated with a financial transaction where it is stored for use in the method. The tree structure may be refined by removing duplicate nodes, mirror nodes and single sided nodes before being downloaded.

BRIEF DESCRIPTION OF THE DRAWINGS

An example of the invention will now be described with reference to the accompanying drawings, in which.

DETAILED DESCRIPTION OF THE INVENTION

Figure 1:
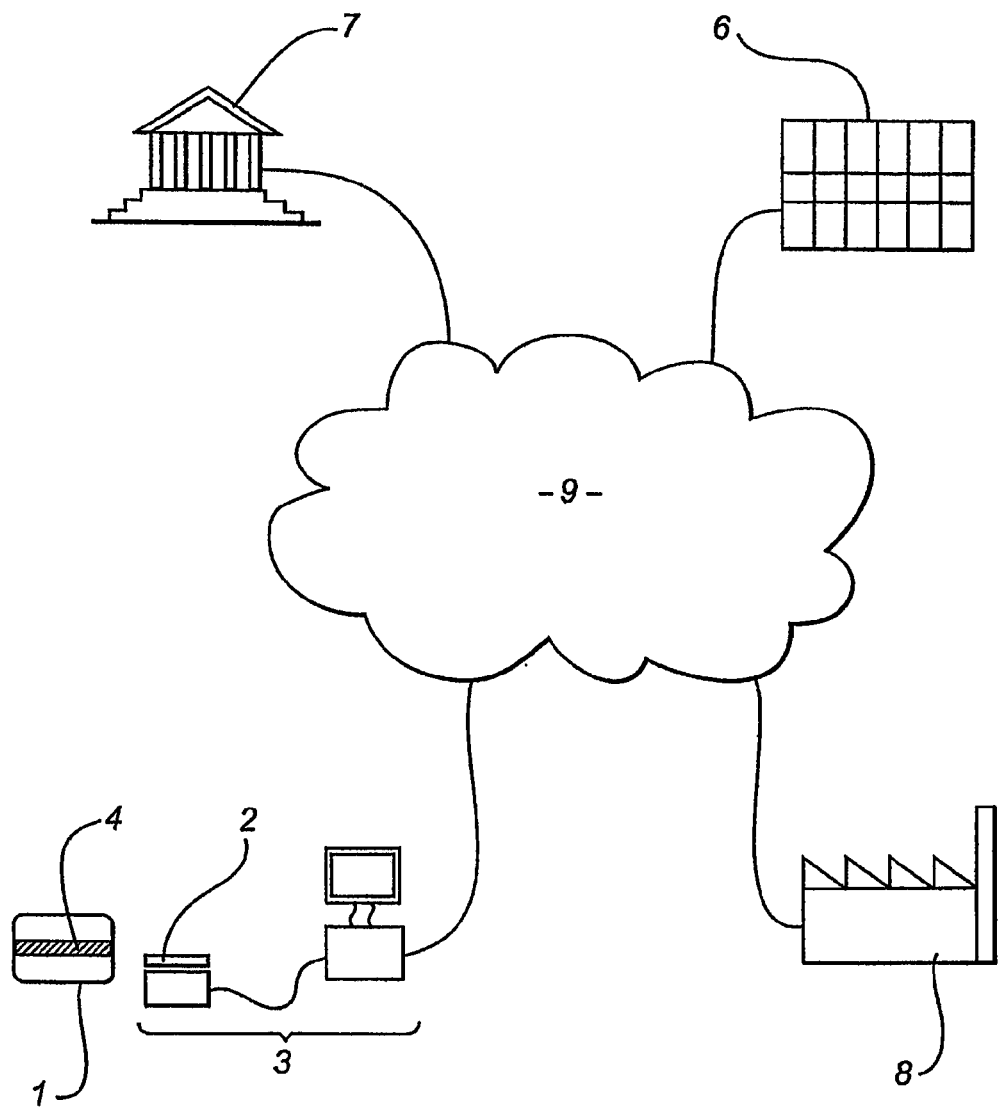
FIG. 1 is a block diagram of the functional environment of a Point of Sale device.

Referring first to FIG. 1, a typical card transaction involves a customer presenting their card 1 to a merchant to purchase goods or services. The merchant swipes the card 1 through a card-reader 2 which is part of a POS device 3. The card reader 2 reads the card number 4 from the card 1, and the device 3 determines the currency of the customer's card account. The device is then able to present the cost to the customer in the currency of their account whether they are at home or abroad.

When the customer is at home, the device realizes that both merchant and customer prefer to use the same currency, and the transaction is considered not to be eligible for direct currency conversion.

When the customer is abroad the device is also able to provide the rate of exchange being applied, and the cost in the local currency. The customer may choose whether to accept the price in either currency, and to confirm the exchange rate that will apply to the transaction if they choose the currency of their account. In this way, the customer is able to have full details of the transaction before receiving a statement from the card issuer.

To enable this functionality the device 3 stores a binary sparse tree in a file. A tree is a series of distinct pathways, each made up of a number of links between nodes. Each node would normally have two outward links representing "1" and "0". So a pathway would be a binary number made up of "1"s and "0"s. The pathways are made to represent BINs in binary form and end in the currency appropriate to that BIN. It then follows that if a BIN is converted to binary form and mapped on to the tree, it will yield the currency of the card carrying the BIN.

Figure 2:
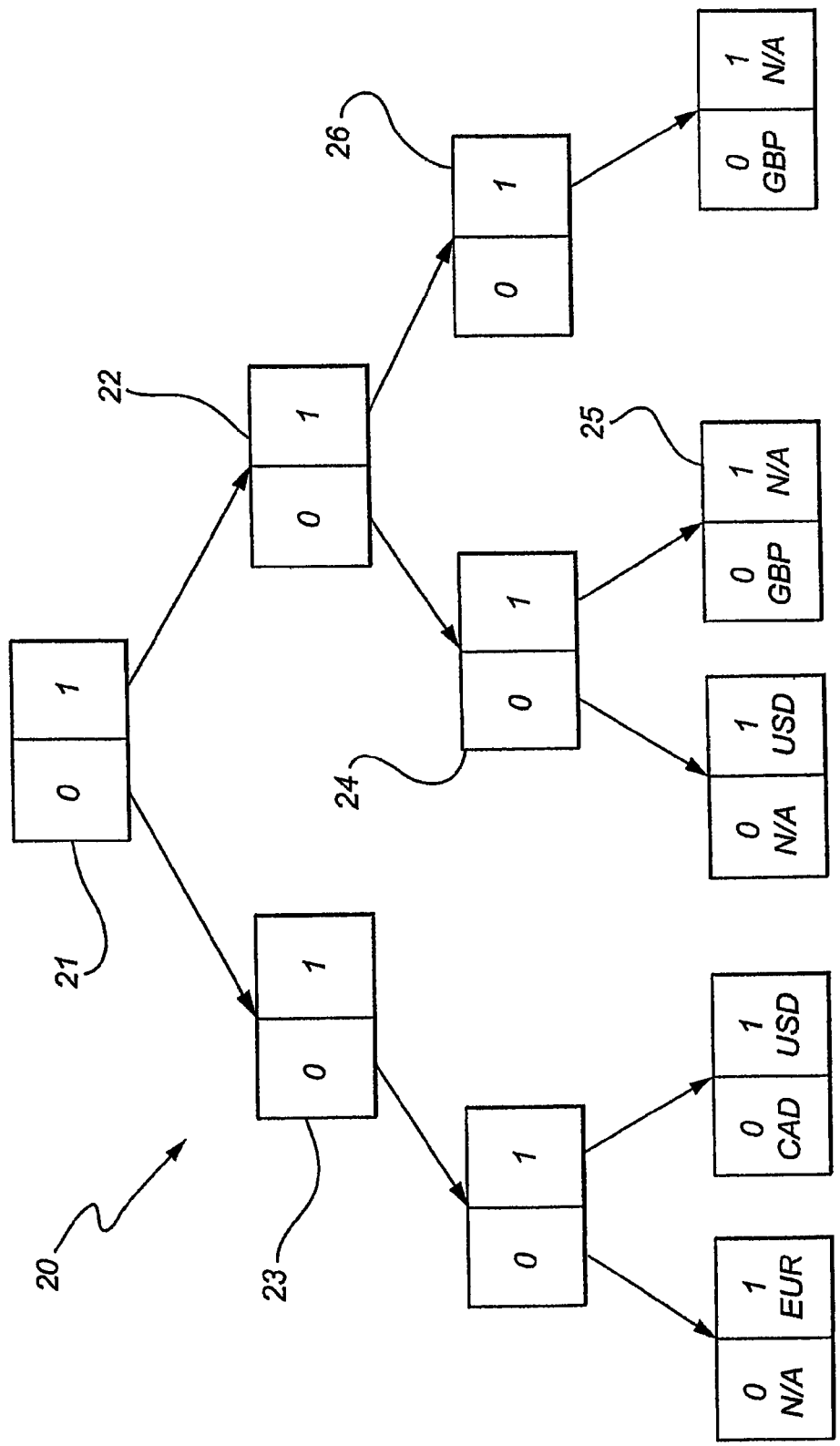
FIG. 2 is a binary sparse tree.

FIG. 2 is a simplified example of such a tree and has been generated to decode the following four bit numbers 0001, 0010, 0011, 1001, 1010, 1011 and 1110.

It can be seen that binary numbers do not appear in the tree. Instead at each node there is a binary decision to be made. An incoming number, say 1010, is processed by the tree one bit at a time. Taking the left hand bit first, that is "1", this bit is used at the first node of the tree 21 to follow the path to node 22. (Had it been "0" it would have followed the path to node 23). At node 22 the next bit "0" is used to follow the tree to node 24. The next bit "1" is used to follow the tree to node 25. The final bit "0" follows the tree to the currency code "GBP" at end-node 25. Note that the tree does not contain any dead end nodes, that is numbers that are not supposed to be there will result in no currency being found.

Such a tree is generated from information provided by the card networks 6 (for instance Visa or MC), information received from issuing banks 7 and any other information useful in relating cards to currencies. Tree generation is a back-office operation that takes place at a dedicated service provider 8.

Once a basic tree has been generated it is processed a number of times to compress it before installing it on POS devices. These compression processes are explained below: First duplicate nodes are removed. If two nodes A and B are the same, then all other nodes pointing to B can be modified to point at A. Then node B can be deleted. Next mirror nodes are removed. All nodes have two pointers or two currency values. If the two values in the node are the same then any node pointing to the mirror can just take the mirror node value instead. Single sided nodes can be stored in half the space. If only one side of a node has a value, such as node 26, then that node can be stored in half the space. The compression process is repeated until no more changes can be effected. Compression is also done as part of the back-office operation.

The tree is prepared for a POS device to use by saving it as a file, and it is downloaded from the specialist service provider 8 to the device 3 over the Internet 9. Of course, the tree may be downloaded using PSTN or any other communications media. Note that the original tree contains memory pointers. If there are 16384 or less nodes the whole tree can be stored in less than 64 kbytes. This is important because then each pointer can be replaced by a 16 bit offset within the file. To ensure that reaching an end-node is correctly identified, all the end-nodes are moved to the start of the file. Then if an offset value is above a certain value it is known not to be an end-node.

To determine the currency of a card a selected part of the card number, for instance the BIN number, is traversed through the tree, taking the correct branch at each node depending on the bit values of the number. As in the example above, if the card number is ten (binary value 1010) the result arrived at is 'GBP'. Currency codes do not necessarily have to be at the end-nodes of the tree. Other information could be presented there, for instance country codes. In this case the result from the tree may require further mapping to establish the appropriate currency code. For example a country code for France could be mapped to the Euro. More complicated situations could also arise, for instance where a British bank issues a card for a US dollar account.

The financial side of the transaction may be managed by the POS device, or by a server belonging to a bank or card issuer. The POS device or the server may collect particular data related to DCC transactions, and store it in a DCC statistical data packet for transmission to the DCC Operating Company. This company may be a bank or card issuer or another party. The packet may be analysed and a report produced.

The data allows for the performance to be monitored. In the event of poor performance the DCC Operator can decide to carry out re-training or remove the service. On the other hand good performance can lead to activation of a reward under an incentive program.

The value fields collected to enable the service performance to be measured include, Total number of sale-type transactions; Total number of potential DCC sale-type transactions; Total number of actual DCC sale-type transactions; Total value of all sale-type transactions; Total value of potential DCC sale-type transactions; Total value of actual DCC sale-type transactions; Total number of refund-type transactions Total number of potential DCC refund-type transactions; Total number of actual DCC refund-type transactions; Total value of all refund-type transactions; Total value of potential DCC refund-type transactions; Total value of actual DCC refund-type transactions. All amounts are in base currency of the PoS device or server.

After a successful transmission of a stats block to the rates download host all the stats counters and amount totals should be reset to 0.

Pre-auths and supplemental pre-auths should be ignored for stats purposes.

A tip, if added to the value of an existing transaction, should update the total by just the tip amount, but not increment the transaction count. However if a tip is a completely separate transaction it should be treated as a normal sale. A void transaction should decrement the appropriate totals and decrement the appropriate counts. Potential DCC qualified transactions refers to transactions that qualify as DCC eligible and may or may not be accepted. Actual DCC qualified transactions refers to transactions that qualify as DCC eligible and were accepted and converted. Terminal non-DCC qualified transactions refer to transactions that did not qualify at all as DCC eligible. i.e. the card prefix was not recognised by the DCC currency recognition module.

Although the invention has been described with reference to a particular example, it should be appreciated that many variations are possible. For instance, a simple modification of the file size to 256 kbytes using 16 bit indices allows the maximum number of nodes to be increased to 65536. It is also possible to avoid moving the end-nodes to the start of the file.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method for operating equipment associated with a financial transaction to determine the currencies available to be used for a card transaction using that equipment, the method comprising the steps of:
   recording a card number from a card related to a customer's account;
   selecting by a computer processor all or part of the card number;
   applying by the processor the selected number to a binary tree, paths in the tree representing numbers in binary form and ending in end-nodes coded with information related to respective currencies, including automatically mapping the selected number in binary form onto the tree one bit at a time to traverse the tree and arrive at an end-node of the tree coded with information related to the currency of the customer's card account; and
   determining by the processor the currency of the customer's card account based on that end-node of the tree.

2. A method according to claim 1, further comprising the steps of:
   comparing the currency of the customer's card account with one or more currencies predetermined for the equipment; and,
   if the comparison indicates different currencies, providing direct currency conversion services.

3. A method according to claim 2, further comprising comparing defaults to a predetermined currency in the event that no match is found.

4. A method according to claim 1, wherein the equipment is one of:
   a Point of Sale (PoS) device, an automated teller machine (ATM) or equipment associated with telephone or Internet sales.

5. A method according to claim 4, wherein, in the case of a PoS device or an ATM, the step of recording a card number from the card comprises the equipment automatically reading the number.

6. A method according to claim 4, wherein, in the case of telephone or Internet sales, the step of recording a card number from the card comprises remotely manually entering the number.

7. A method according to claim 1, wherein the tree is downloaded and stored at the equipment.

8. A method according to claim 1, wherein other determinations are made from the card number.

9. A method according to claim 8, wherein the other determination is detecting local cards.

10. A method according to claim 8, wherein the other determination is detecting trading area cards.

11. A method according to claim 1, wherein the equipment comprises a card reader, a computer processor and memory, a printer and a user interface.

12. A method according to claim 11, comprising the further step of storing the tree in the memory in the form of a file.

13. A method according to claim 12, wherein the tree is a sparse binary tree.

14. A method according to claim 12, wherein the end-nodes of the tree are coded with country codes or currency codes.

15. A method according to claim 12, wherein, when no match is found, displaying all currencies of the card and device are displayed.

16. A method according to claim 15, wherein the relevant exchange rates are also displayed.

17. A method according to claim 1, wherein the step of determining the currency comprises interpreting the codes at the end-node.

18. A method according to claim 1, wherein the step of determining the currency comprises using information coded by the end-node to look up a currency code in an ancillary table.

19. A method according to claim 1, further comprising the step of printing a docket.

20. A method according to claim 19, wherein the docket includes the price in the currency selected and in the native currency of the equipment as well as the exchange rate.

21. A method according to claim 20, wherein all the numbers printed are captured for use in preparing a statement for the customer's account.

22. Equipment for use associated with a financial transaction, the equipment comprising: a card reader for reading a card; a memory, wherein a binary tree is stored as a file in the memory, paths in the tree representing numbers in binary form and ending in end-nodes coded with information related to respective currencies; and a computer processor, wherein the processor is configured to select all or part of a number read by the card reader and to automatically map the selected number in binary form onto the tree one bit at a time to traverse the tree and arrive at an end-node of the tree coded with information related to a currency associated with the card.

23. A computer program product comprising coded instructions which, when run on a processor, implement the steps of:
   recording a card number from a card related to a customer's account;
   selecting all or part of the card number;
   applying the selected number to a binary tree, paths in the tree representing numbers in binary form and ending in end-nodes coded with information related to respective currencies, including automatically mapping the selected number in binary form onto the tree one bit at a time to traverse the tree and arrive at an end-node of the tree coded with information related to the currency of the customer's card account; and
   determining the currency of the customer's card account based on that end-node of the tree.

* * * * *